(12) United States Patent
De Smet et al.

(10) Patent No.: US 10,240,505 B2
(45) Date of Patent: Mar. 26, 2019

(54) CONTROLLING NITROGEN OXIDE EMISSIONS IN THE EXHAUST GAS OF AN INTERNAL COMBUSTION ENGINE

(71) Applicant: Ford Global Technologies, LLC, Dearborn, MI (US)

(72) Inventors: Frederik De Smet, Genk (BE); Mario Balenovic, Waalre (NL); Vijay Krishnaswamy, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 15/604,512

(22) Filed: May 24, 2017

(65) Prior Publication Data

US 2017/0350293 A1 Dec. 7, 2017

(30) Foreign Application Priority Data

Jun. 1, 2016 (DE) .......... 10 2016 209 566

(51) Int. Cl.
| | |
|---|---|
| *F01N 3/20* | (2006.01) |
| *F01N 3/08* | (2006.01) |
| *F01N 11/00* | (2006.01) |
| *F01N 13/00* | (2010.01) |
| *F01N 13/08* | (2010.01) |
| *F01N 9/00* | (2006.01) |

(52) U.S. Cl.
CPC .......... *F01N 3/208* (2013.01); *F01N 3/0814* (2013.01); *F01N 3/0842* (2013.01); *F01N 3/0871* (2013.01); *F01N 3/2066* (2013.01); *F01N 9/00* (2013.01); *F01N 11/00* (2013.01); *F01N 13/008* (2013.01); *F01N 13/082* (2013.01); *F01N 2560/026* (2013.01); *F01N 2570/14* (2013.01); *F01N 2610/02* (2013.01); *F01N 2900/08* (2013.01); *F01N 2900/1402* (2013.01); *F01N 2900/1411* (2013.01); *F01N 2900/1602* (2013.01); *F01N 2900/1812* (2013.01)

(58) Field of Classification Search
CPC ...... F01N 3/0871; F01N 3/208; F01N 3/2066; F01N 2560/026; F01N 2610/02
See application file for complete search history.

(56) References Cited

U.S. PATENT DOCUMENTS

| | | |
|---|---|---|
| 2014/0056788 A1 | 2/2014 | Breitschaedel et al. |
| 2015/0143798 A1* | 5/2015 | Lee .................... F02D 41/1446 60/274 |

* cited by examiner

*Primary Examiner* — Jonathan Matthias
(74) *Attorney, Agent, or Firm* — Julia Voutyras; McCoy Russell LLP (57) ABSTRACT

A method is provided for controlling nitrogen oxide emissions in the exhaust gas of an internal combustion engine by means of successive actuation of catalytic converters in the exhaust tract and of the internal combustion engine, wherein the catalytic converters or the internal combustion engine are actuated in succession if the actuation of a first device is not sufficient for reducing the nitrogen oxide emissions. An arrangement for carrying out the method is also provided.

17 Claims, 7 Drawing Sheets

CONTROLLING NITROGEN OXIDE EMISSIONS IN THE EXHAUST GAS OF AN INTERNAL COMBUSTION ENGINE

RELATED APPLICATIONS

This application claims priority to German Patent Application No. 102016209566.8, filed Jun. 1, 2016. The entire contents of the above-referenced application are hereby incorporated by reference in its entirety for all purposes.

FIELD

The disclosure relates to a method for controlling nitrogen oxide emissions in the exhaust gas of an internal combustion engine.

BACKGROUND/SUMMARY

For the purification of exhaust gas of an internal combustion engine, various catalytic converter devices may be arranged in the exhaust tract of the internal combustion engine. For the removal of nitrogen oxides from the exhaust gas for temporary adsorption and subsequent conversion into nitrogen oxides, use is made of nitrogen oxide storage catalytic converters (also referred to as lean NOx traps, LNT). During lean-burn operation of an internal combustion engine, that is to say during operation with an air/fuel mixture in which an excess of air and thus oxygen is present, nitrogen oxides that are generated can be stored in an LNT; for this purpose, the LNT oxidizes the nitrogen monoxide (NO) contained in the lean exhaust gas to form nitrogen dioxide ($NO_2$), and subsequently stores this in the form of nitrates. With increasing nitrogen oxide loading of the LNT, the storage capacity thereof progressively decreases.

To restore the storage capacity of the LNT, the LNT may be regenerated. During the regeneration, the stored nitrogen oxides are desorbed again and are reduced, on catalytically active components of the LNT and with the aid of the rich exhaust-gas constituents (CO, HC), to form nitrogen. For this purpose, the exhaust gas is enriched, for example by way of operation of the internal combustion engine with a rich mixture or a corresponding increase of the fuel injection quantity in the engine and a reduction of the fresh-air supply. Here, a sub-stoichiometric ratio of oxygen to fuel is generated. The ratio may also be expressed by a lambda value, which is then less than 1. Said sub-stoichiometric ratio may also, aside from rich operation of the internal combustion engine, be produced by injection of fuel into the exhaust tract. Here, it is primarily nitrogen oxides that are removed, for which reason this is also referred to as a DeNOx purge.

Furthermore, nitrogen oxides may be removed from the exhaust gas by catalytic converters for selective catalytic reduction (SCR catalytic converter). Here, the nitrogen oxides are reduced to form nitrogen with the aid of a reducing agent, generally ammonia, which is introduced in the form of an aqueous urea solution into the exhaust tract and is stored in the SCR catalytic converter.

Operation of the catalytic converters for the reduction of nitrogen oxides may be carefully controlled. Control variables such as emissions, fuel economy, vibrations of the corresponding motor vehicle, and reducing agent consumption may be weighed against one another. Here, the operation of the catalytic converter devices and of the internal combustion engine are also controlled with mutual dependency. Furthermore, vibrations of the motor vehicle and the emissions of carbon dioxide are to be kept as low as possible.

In the case of fixed settings of the internal combustion engine and of the exhaust-gas aftertreatment devices, the pollutant emissions vary considerably in a manner dependent on factors such as driving style and operating conditions. High nitrogen oxide emissions could duly be remedied by constant introduction of reducing agent, but this can result in undesired ammonia slippage. Furthermore, with the high consumption, reducing agent would be wasted. It would alternatively be possible for the LNT to be regenerated more frequently, but frequent regeneration of the LNT adversely affects fuel consumption.

The inventors herein have recognized the above issues and provide an approach to regulate the nitrogen oxide emissions of an internal combustion engine while realizing efficient consumption of reducing agent and fuel. In one example, a method for controlling nitrogen oxide emissions in exhaust gas of an internal combustion engine, in an exhaust tract of which there are arranged at least one nitrogen oxide storage catalytic converter (LNT) and at least one catalytic converter for selective catalytic reduction (SCR), at least one nitrogen oxide sensor, an introduction device arranged upstream of the SCR for a reducing agent, and a control device, is provided. The method includes measuring or estimating nitrogen oxide values in an exhaust tailpipe region and detecting an upward deviation of the nitrogen oxide values in the exhaust tailpipe region from a setpoint value. The method further includes, responsive to detecting the upward deviation, actuating the introduction device in order to provide a first correction of the nitrogen oxide values in the exhaust tailpipe region, and if the nitrogen oxide values are still deviated upward from the setpoint value after the actuation of the introduction device, performing a first adjustment of the internal combustion engine to regulate a regeneration of the LNT in order to provide a second correction of the nitrogen oxide values in the exhaust tailpipe region. The method further includes, if the nitrogen oxide values are still deviated upward from the setpoint value after the first adjustment of the internal combustion engine, performing a second adjustment of the internal combustion engine to regulate an operating mode of the internal combustion engine in order to provide a third correction of the nitrogen oxide values in the exhaust tailpipe region.

The method is advantageous because the nitrogen oxide emissions can be controlled by various inter-coordinated devices which are associated with the exhaust tract. Furthermore, the nitrogen oxide emissions can be dynamically controlled over a relatively long operating period. After a correction of the nitrogen oxide emissions, the method can at any time be started again.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION

DETAILED DESCRIPTION

According to embodiments disclosed herein, it is advantageously the case that both the nitrogen oxide reduction and the regeneration of the nitrogen oxide storage catalytic converters offer starting points for the regulation of the nitrogen oxide emissions. As will be explained in more detail below, the function of one device after the other is regulated in cascaded fashion, for example starting with the SCR, then the LNT if the control capabilities of the SCR are no longer sufficient for controlling the nitrogen oxide emissions, and then correspondingly the internal combustion engine.

In one example, the SCR function is controlled to control the NOx level by increasing a rate of introduction of reducing agent into the exhaust tract upstream of the SCR. Here, the quantity of ammonia that is generally used as reducing agent is advantageously increased, such that more nitrogen oxides can be reduced in order to correct an excessively high nitrogen oxide value.

In a further example, the rate of introduction of reducing agent into the exhaust tract upstream of the SCR may be decreased. Here, slippage of ammonia is advantageously counteracted. Here, this strategy is selected if it is detected that ammonia is escaping from the SCR or if it is sought for AdBlue®, which is generally used for introduction as urea solution, to be consumed sparingly.

Here, it is provided that the rate of introduction of reducing agent is increased or decreased if a predefined threshold value of reducing agent loading has been reached. Here, the threshold value may be adapted to a predefined quantity of ammonia stored in the SCR in order to increase or decrease the reduction of nitrogen oxides.

Controlling the LNT to control the NOx level may include increasing a frequency of regeneration events of the LNT. In this way, it is advantageously the case that stored nitrogen oxides are reduced before the storage capacity is exhausted.

In a further example, it is alternatively or additionally provided that the intensity of the regeneration events of the LNT is increased. Here, individual regeneration events are performed for longer, in other words a rich exhaust-gas mixture is provided for longer, in order to regenerate the LNT particularly thoroughly.

It may be provided that the intensity and the frequency of the regeneration events are weighed against each other in a manner dependent on the present operating state of the catalytic converters and of the internal combustion engine. Here, this is also referred to as an adaptation of a threshold value, in a manner dependent on what is possible and desirable, in order to influence the conditions which have the aim of achieving a particular regeneration efficiency, through detection of the operating conditions of the catalytic converters and of the internal combustion engine. In other words, the target values for the minimum efficiency of a regeneration event can be lowered in order to increase the frequency of the regeneration events.

Here, it may be provided that the intensity and frequency of the regeneration events are configured in a manner dependent on parameters selected from the group comprising temperature and volume flow in the LNT and on the rotational speed and load of the internal combustion engine, wherein the value ranges of the parameters may be varied. In this way, the range of operating states which permit regenerations is advantageously expanded or reduced, such that lower or higher regeneration efficiency is achieved.

In a further example, the successive actuation of the catalytic converters begins with the engine, is continued with the LNT regeneration, and ends with the actuation of the introduction device. In other words, in this embodiment, for the control of the nitrogen oxide emissions, depending on the efficiency of the individual steps, firstly the nitrogen oxide emissions of the internal combustion engine are regulated, then the regeneration of the LNT is regulated, and then the function of the SCR is regulated.

A second aspect of the disclosure relates to an arrangement for carrying out the method according to the disclosure, the arrangement comprising an internal combustion engine, an exhaust tract, at least one LNT arranged in the exhaust tract, at least one SCR arranged in the exhaust tract, a control device, at least one nitrogen oxide sensor and a device for introducing a reducing agent into the exhaust tract.

A third aspect of the disclosure relates to a motor vehicle having an arrangement according to the disclosure.

Figure 1:
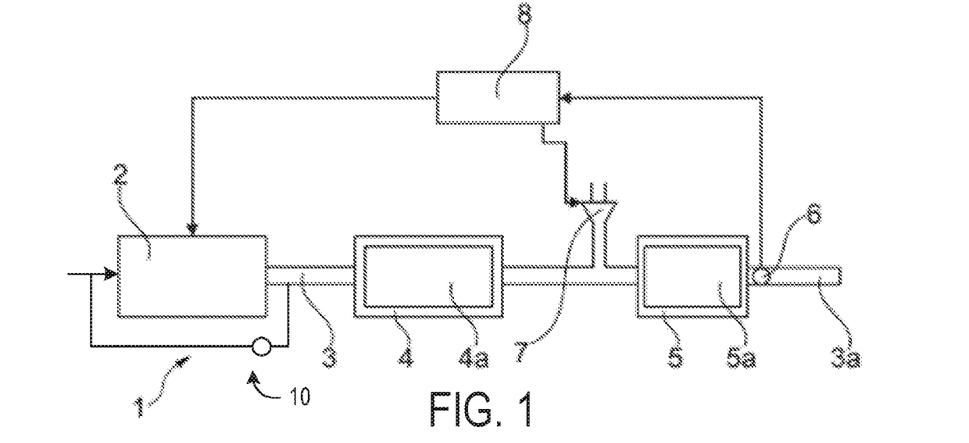
FIG. 1 shows an embodiment of an arrangement according to the disclosure.

Turning now to FIG. 1, the arrangement 1 according to the disclosure comprises an internal combustion engine 2 which is connected to an exhaust tract 3 for discharging the exhaust gas. The internal combustion engine 2 may be an auto-ignition engine or an applied-ignition engine and may have a conventional number of cylinders. A first catalytic converter device 4 and a second catalytic converter device 5 are arranged in the exhaust tract 3. The first catalytic converter device 4 comprises a nitrogen oxide storage catalytic converter (LNT) 4a. The LNT 4 may be an active or a passive LNT. The LNT 4a may also, in one embodiment, be a dual LNT system, that is to say may comprise two LNTs, which can be regenerated independently of one another.

The second catalytic converter device 5 comprises a catalytic converter for selective catalytic reduction (SCR) 5a. In a further embodiment, it is also possible for multiple components to be arranged in the second catalytic converter device 5, for example additionally a particle filter, which may also have a catalytically active coating.

Further devices for exhaust-gas aftertreatment may be arranged in the exhaust tract 3 or in the catalytic converter devices, for example oxidation catalytic converters, three-way catalytic converters, and particle filters. A nitrogen oxide sensor 6 is arranged downstream of the second catalytic converter device 5. Further nitrogen oxide sensors and other sensors may be arranged at any desired locations in the exhaust tract, also in the catalytic converter devices.

An introduction device 7 (also referred to as a reductant injector) for introducing a reducing agent into the exhaust tract 3 is arranged upstream of the second catalytic converter device 5. As reducing agent, an aqueous urea solution is introduced from a corresponding tank (not shown), from which aqueous urea solution urea is released in the exhaust tract, which urea is stored in the SCR 5 and is used for reducing nitrogen oxides present in the exhaust gas.

Additionally, in some examples, the arrangement 1 may include an exhaust gas recirculation (EGR) system 10. The EGR system 10 may include an EGR passage coupling the exhaust tract to an intake passage of the engine and an EGR valve controlling the flow of exhaust gas from the exhaust tract to the intake passage. The flow of exhaust gas through the EGR system, which may be referred to as the EGR rate, may be controlled to lower NOx production in the engine.

The internal combustion engine 2, the nitrogen oxide sensor 6, the introduction device 7, and the catalytic converters 4a and 5a are connected to a control device 8. The control device 8 comprises a processing unit and a memory. The memory may store non-transient instructions that are executable by the processing unit to carry out the methods described herein. The processing unit is configured to receive and evaluate data from the nitrogen oxide sensor 6 and from further sensors. The control device 8 is configured to transmit control commands to the introduction device 7 and to the internal combustion engine 2 in order to control, respectively, a rate of introduction of reducing agent and the composition of the fuel mixture in the internal combustion engine 2 and thus of the exhaust gas. Furthermore, the control device may be connected to devices for injecting fuel (not shown) into the exhaust tract 3 in order to enrich the exhaust gas for the purposes of regenerating the one or more LNTs 4a.

Figure 2:
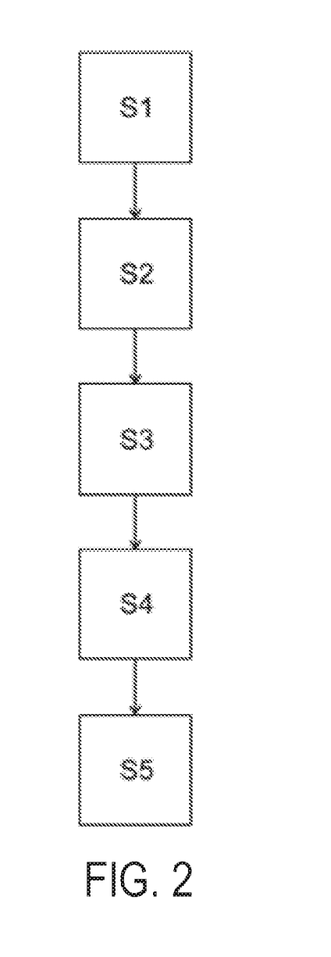
FIG. 2 shows a flow diagram of an embodiment of the method according to the disclosure.

In a first embodiment of a method for controlling nitrogen oxide emissions in the exhaust gas of motor vehicles as per the illustration of FIG. 2, it is provided that, in a first step S1, the nitrogen oxide concentration in the exhaust tailpipe region 3a of the exhaust tract 3, that is to say downstream of the SCR 5a, is measured by the nitrogen oxide sensor 6. The measured value is transmitted to the control device 8. In the control device 8, in a second step S2, it is detected whether the nitrogen oxide values in the exhaust tailpipe region 3a deviate from a setpoint value. The setpoint value is ideally zero, such that the mere presence of nitrogen oxides is already evaluated as a deviation from the setpoint value. The setpoint value may also be referred to as a target value which it is sought to attain. Furthermore, measurement may be performed over a time period, such that a gradual change in nitrogen oxide concentration in the exhaust tailpipe region 3a is detected. Here, a deviation from the setpoint value is also referred to as an error. To determine whether an error is present, the measured values are compared by an evaluation matrix in the control device 8. The evaluation matrix determines the error of the nitrogen oxide concentration in the exhaust tailpipe 3a. Here, it is possible to evaluate nitrogen oxides accumulated per kilometer or over a time interval or over the operating duration of the internal combustion engine 2. As an alternative to the measurement of the nitrogen oxide concentration, this can also be modeled in a manner known to a person skilled in the art.

Figure 3:
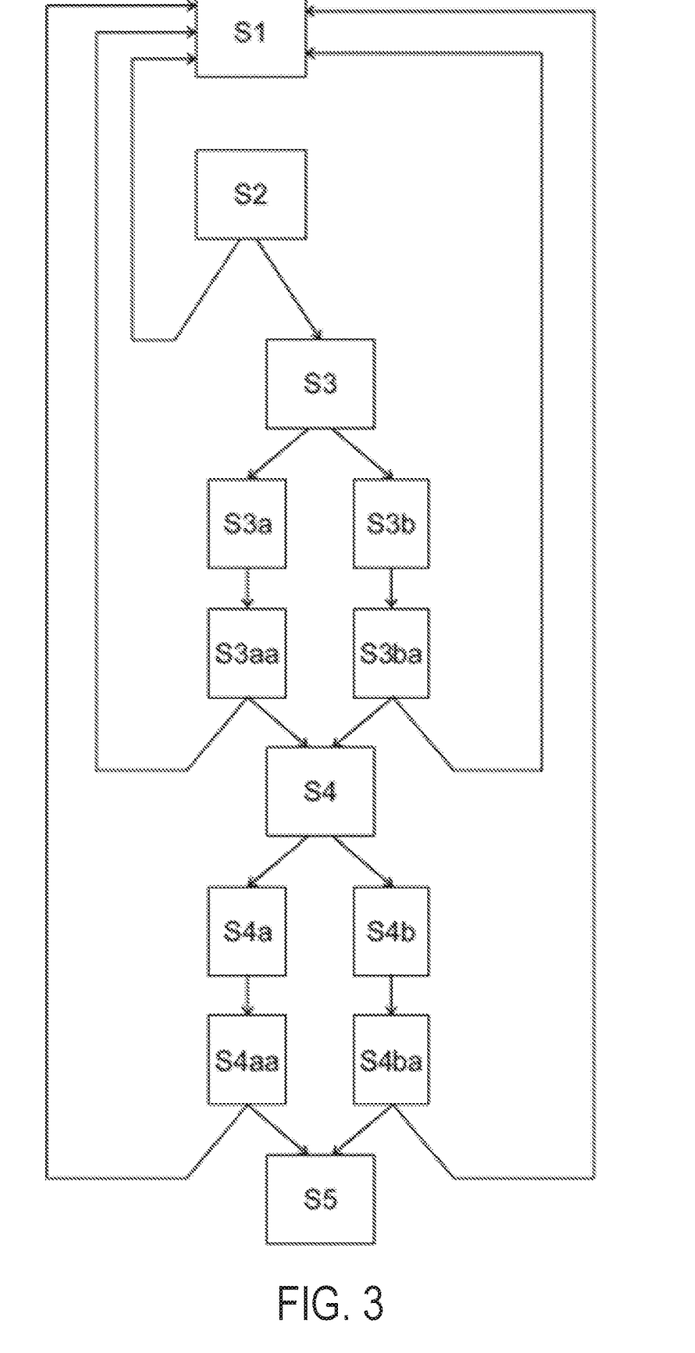
FIG. 3 shows a flow diagram of an embodiment of the method according to the disclosure.

If the nitrogen oxide concentration lies above the setpoint value, then in a third step S3, the control device 8 actuates the introduction device 7 in order to influence the nitrogen oxide concentration by changing the rate of injection of reducing agent into the exhaust tract 3. As illustrated in FIG. 3, in a step S3a, the rate of introduction of reducing agent is increased. In this way, more reducing agent, that is to say conventionally ammonia, is available for the reduction of nitrogen oxides in the SCR 5a. In another strategy, in an alternative step S3b, the rate of introduction of reducing agent may also be reduced in order to counteract slippage of ammonia out of the SCR 5a.

In steps S3aa and S3ba following steps S3a and S3b, the nitrogen oxide concentration in the exhaust tailpipe region 3a is again measured. If the nitrogen oxide concentration has been regulated down to the setpoint value, a return is made to step S1. If the nitrogen oxide concentration still lies above the setpoint value, the change of the rate of injection of reducing agent is not sufficient. Then, in a fourth step S4, the internal combustion engine 2 is actuated in order to influence the regeneration of the LNT 4a. Here, in a first strategy, in a step S4a, the intensity of a regeneration of the LNT 4a can be increased, that is to say rich operation of the internal combustion engine 2 is maintained for longer, ideally to the point of complete regeneration of the LNT 4a. In a second strategy, in an alternative step S4b, the frequency of the regeneration events is increased, such that the LNT 4a is regenerated more frequently.

In steps S4aa and S4ba following steps S4a and S4b, the nitrogen oxide concentration in the exhaust tailpipe region 3a is again measured. If the nitrogen oxide concentration has been regulated down to the setpoint value, a return is made to step S1. If the nitrogen oxide concentration still lies above the setpoint value, the actuation of the internal combustion engine 2 is not sufficient to control the NOx. In this case, in a fifth step S5, the control device 8 in turn actuates the internal combustion engine 2 in order to change the operating conditions such that the fewest possible nitrogen oxides are generated, in order to provide a correction of the nitrogen oxide values in the exhaust tailpipe region 3a, if the actuation of the LNT 4a and of the SCR 5a is not sufficient to correct the error.

Figure 4:
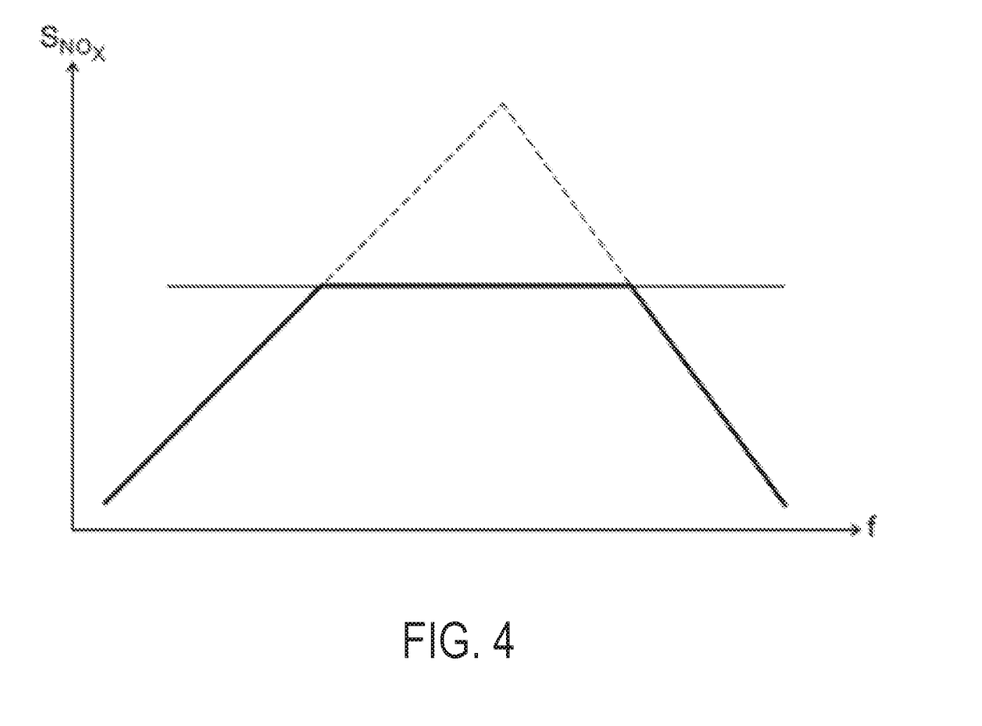
FIG. 4 shows a diagram of a cascaded profile of regulation of the nitrogen oxide concentration in the exhaust tract.

The cascaded, successive actuation of the introduction device 7 and of the internal combustion engine 2 in a manner dependent on the effectiveness of the implemented measures can be represented in a diagram as per FIG. 4. The diagram plots the nitrogen oxide concentration $C_{NOx}$, as a measure for the intensity of a correction signal, versus time. In the diagram, the horizontal line represents the limit up to which a deviation of the nitrogen oxide concentration from the setpoint value can be corrected through influencing of the SCR 5a, that is to say through actuation of the introduction device 7. The solid line therefore represents a ratio of the possible correction of the nitrogen oxide concentration through the action of the SCR 5a. At the horizontal line, the capabilities of the SCR are exhausted, which is manifested in an attainment of the possible rate of reducing agent or in increased ammonia slippage in the continued presence of a nitrogen oxide concentration in the exhaust tailpipe 3a. In this case, according to the method, an "overflow" of the correction signal to the LNT 4a occurs, that is to say an actuation of the internal combustion engine 2 occurs, in order to influence the regeneration intensity or frequency (dashed line).

Alternatively, the diagram in FIG. 4 can also be interpreted as a cascaded actuation of an embodiment of the method which can be commenced with the actuation of the internal combustion engine. If this measure is not sufficient to reduce the nitrogen oxide emissions, an "overflow" of the correction signal to the SCR 5a occurs, that is to say an actuation of the introduction device 7 occurs.

By way of example, in the control device 8, the error is analyzed and corrected by a regulator, known to a person skilled in the art, with a P component with proportional characteristic and an I component with integral characteristic. In accordance with the determined deviation, the error is corrected firstly through readjustment of the introduction of reducing agent (step S3a or S3b) in order to influence the function of the SCR 5a, and then, upon attainment of the possible value of introduced reducing agent or upon an onset of ammonia slippage or in the presence of excessively high ammonia slippage, through actuation of the internal combustion engine 2 (step S4a or S4b) in order to influence the function of the LNT 4a. Here, the I component performs integration only if the error does not decrease quickly enough. For this purpose, the error is derived, and the derived value is compared with a minimum value. The difference is in this case integrated. If the setpoint value is reached, the integrator (the I component) is reset.

The error in the nitrogen oxide concentration in the exhaust tailpipe region 3a may be represented as a curve of a function dependent on the error (not shown). Here, the curve of the error may be adapted, through the actuation of the introduction device 7 and of the internal combustion engine 2, to a curve which corresponds to a predefined value of the nitrogen oxide concentration. Said adaptation may be performed for the control both of the function of the SCR 5a (step S3a or S3b) and of the LNT 4a.

In a further strategy, the function of the LNT 4a may also be controlled such that the operating conditions of the LNT 4a and internal combustion engine 2 are analyzed and, in a manner dependent thereon, the intensity and the frequency of the regeneration events are weighed against one another in a manner dependent on the present operating state of the catalytic converters and of the internal combustion engine. The threshold value for the starting of a regeneration is in this case adapted in a manner dependent on what is possible and desired.

The method is likewise applicable to arrangements which deviate from the arrangement 1 described above. For example, if no SCR is provided, the signal for overflow to the LNT 4a is equal to zero, and the function of the LNT 4a is immediately controlled by the internal combustion engine 2. If no LNT is provided, the internal combustion engine 2 is immediately actuated so as to keep the nitrogen oxide emissions low. Furthermore, special settings may be implemented for special conditions such as acceleration, cold start etc.

Figure 5:
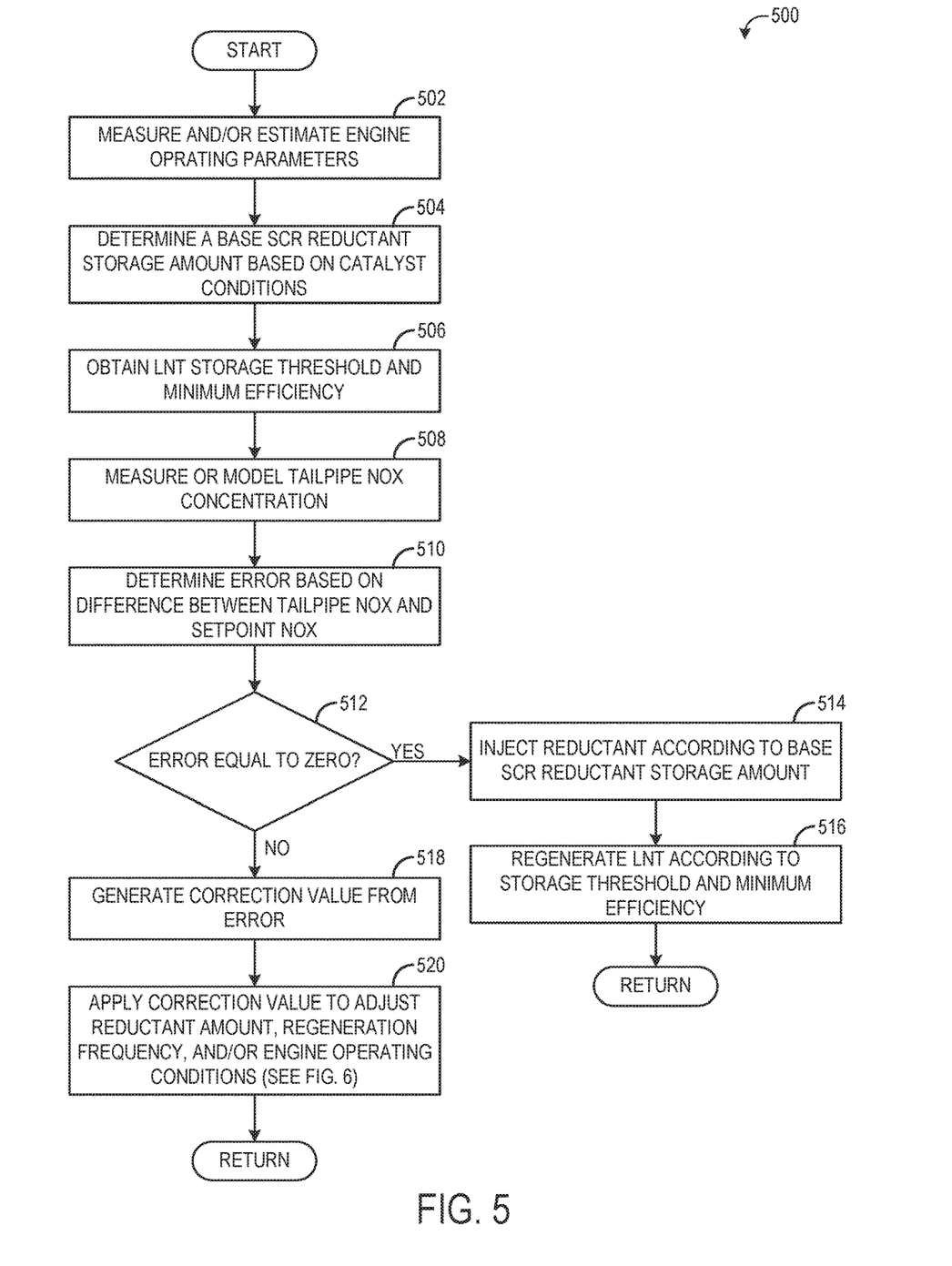
FIG. 5 is a flow chart illustrating a method for controlling NOx according to another embodiment of the disclosure.

Turning to FIG. 5, a second embodiment of a method 500 for controlling NOx in an engine system, such as arrangement 1 of FIG. 1, is illustrated. Instructions for carrying out method 500 and the rest of the methods included herein may be executed by a controller (such as control device 8 of FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 502, method 500 includes estimating and/or measuring one or more engine operating parameters and/or exhaust system conditions (including conditions of the SCR device and LNT). The engine operating parameters may include engine speed, engine load, engine temperature, and other operating parameters. At 504, method 500 includes determining a base SCR reductant storage amount based on SCR conditions. The base SCR reductant storage amount may reflect an amount of reductant, such as ammonia, that is estimated to be stored in the SCR. The supply of reductant provided to the SCR may be controlled based on this base reductant storage amount, such that the SCR stores reductant at the base storage amount. The base reductant storage amount may reflect a trade-off between higher NOx conversion (provided with higher reductant storage) and a lower reductant slip (provided with lower reductant storage). The base reductant storage amount may be obtained from a look-up table, for example, that outputs the base reductant storage amount from SCR temperature and/or other SCR conditions (such as cumulative reductant supply, cumulative or instantaneous NOx storage, and exhaust gas mass flow) as inputs, for example. In this way, the amount of reductant stored and supplied to the SCR may be a function of SCR conditions. However, other mechanisms for determining the base reductant amount are possible, such a predefined base amount that is determined from system characteristics (e.g., SCR dimensions).

At 506, method 500 includes obtaining an LNT NOx storage threshold and a predicted minimum LNT purge/regeneration efficiency. The LNT NOx storage threshold may represent the maximum amount of NOx that can be stored by the LNT before a regeneration is triggered. For example, once a measured or estimated amount of NOx stored in the LNT reaches the NO storage threshold, regeneration of the LNT may be carried out. The LNT NOx storage threshold may comprise a trade-off between increased NOx conversion and lower fuel consumption (e.g., the lower the storage threshold, the more NOx may be converted but with a higher fuel penalty). The predicted minimum LNT purge/regeneration efficiency may represent engine and/or LNT conditions that are predicted to provide a minimum purge efficiency. For example, the conditions may include engine temperature, LNT temperature, engine speed and load, and/or other conditions that influence how complete or efficient the regeneration may be. The minimum efficiency may reflect the minimum allowable efficiency. That is, if the prevailing conditions are such that the regeneration efficiency would be less than the minimum efficiency, the regeneration may not be carried out until conditions change. The minimum efficiency may also comprise a trade-off between increased NOx conversion and lower fuel consumption (e.g., the lower the minimum efficiency, the more NOx may be converted but with a higher fuel penalty). The LNT storage threshold and minimum efficiency may each be predetermined according to system characteristics and/or may be adapted based on LNT age or other factors.

At 508, method 500 includes measuring or modeling tailpipe NOx concentration. The tailpipe NOx may be measured by a sensor, such as sensor 6 of FIG. 1. In other examples, the tailpipe NOx may be estimated based on a NOx model that utilizes aftertreatment system parameters (characteristics of the LNT and SCR, reductant injection amount, regeneration frequency), engine operating parameters (e.g., engine speed and load, exhaust gas recirculation amount), and/or upstream NOx (e.g., measured engine out NOx) to estimate tailpipe NOx (as used herein, tailpipe NOx comprises the amount of NOx downstream of the LNT and SCR and may include a cumulated tailpipe NOx per km or another formula that represents the amount of tailpipe NOx over an interval).

At 510, method 500 includes determining an error based on a difference between tailpipe NOx and setpoint NOx. The setpoint value may be zero, such that the mere presence of NOx is already evaluated as a deviation from the setpoint value and referred to as an error. In other examples, the setpoint value may allow a small amount of NOx and/or may be based on engine operating parameters.

At 512, method 500 includes determining if the error is equal to zero. If the error in NOx concentration is found to be equal to zero (or within a threshold range of zero), then the method proceeds to 514 and injects reductant into/upstream of the SCR according to base SCR reductant storage amount. When the error is zero (or within a threshold range of zero), the tailpipe NOx is effectively equal to the setpoint NOx level, and thus no adaptation to the SCR reductant supply strategy is indicated. Further, at 516, method 500 includes regenerating the LNT according to the storage threshold and predicted minimum efficiency determined at 506. Regenerating the LNT may include adjusting air-fuel ratio (e.g., enriching the air-fuel ratio), in order to supply uncombusted fuel to the LNT, which initiates regeneration. The LNT may be regenerated when the amount of stored NOx in the LNT reaches the storage threshold. Further, the LNT may only be regenerated during conditions where it is determined the regeneration efficiency would be at or above the predicted minimum regeneration efficiency. Method 500 then returns.

Returning to 512, if the error in NOx concentration is found to be not equal to zero (or is outside of a threshold range of zero), method 500 proceeds to 518 to generate a correction value from the error. The correction value may be generated by inputting the error into a proportional/integral (PI) controller. The proportional aspect of the PI controller may apply a controller gain to the error in a manner that accounts for the present value of the error (e.g., such that the correction is proportional to the error). The integral aspect of the PI controller determines the derivative of the error and then calculates a difference between the derivative of the error and a minimum slope (determined based on the error), and then integrates the difference in order to account for past values of the error. The proportional and integral aspects may be added to generate the correction value.

Figure 6:
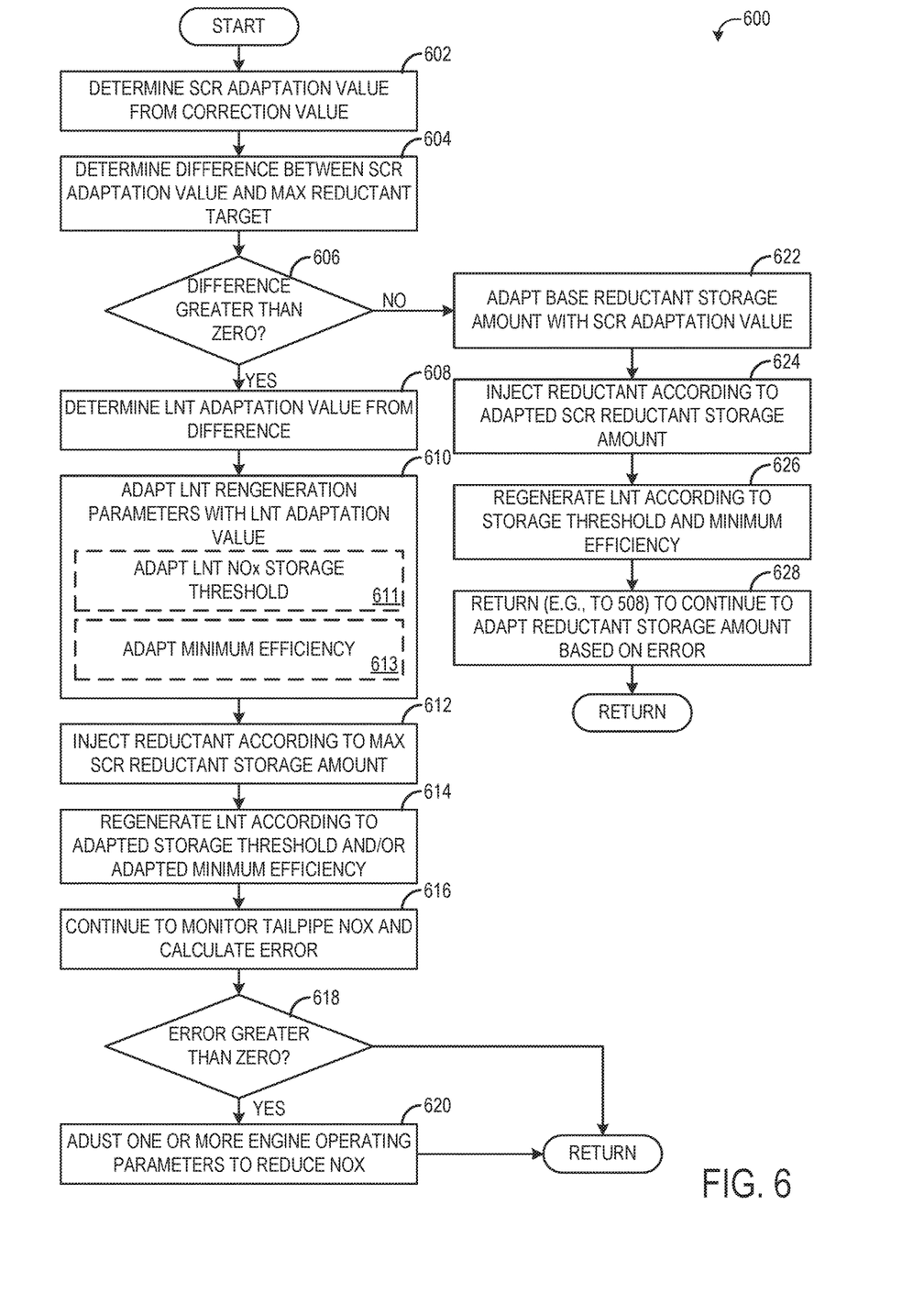
FIG. 6 is a flow chart illustrating a method for applying a correction value in order to control NOx according to another embodiment of the disclosure.

At 520, method 500 applies the correction value to adjust a supplied SCR reductant amount, LNT regeneration frequency and/or engine operating conditions, as described in FIG. 6. Method 500 then returns.

FIG. 6 illustrates a method 600 for adapting one or more aftertreatment system and/or engine conditions based on a correction value, determined by an error between a setpoint NOx level and a tailpipe NOx level, in order to control tailpipe NOx. In one example, the correction value is calculated according to the method 500 described above with respect to FIG. 5.

At 602, method 600 determines an SCR adaptation value from the correction value (e.g., where the correction value is determined by entering an error between measured and setpoint NOx into a PI controller). The SCR adaptation value may be the same as the correction value in one example. In another example, the correction value may be entered into a table or undergo another suitable modification in order to output the SCR adaptation value that is the function of the correction value. The SCR adaptation value may represent an adaptation to an SCR reductant storage target, and thus the correction value may be converted to units representative of a reductant storage target (whether relative or absolute).

At 604, method 600 determines a difference between the SCR adaptation value and a maximum reductant target. The maximum reductant target may represent a maximum amount of adjustment allowed to the base SCR reductant storage amount, such that a tolerated amount of reductant slip is not exceeded. Further, in some examples, when the SCR adaptation value is less than a minimum value, the minimum value may replace the calculated SCR adaptation value in the calculations described below. In this way, when the error between the measured and setpoint NOx is low (or negative), a target amount of reductant will still be supplied to the SCR.

At 606, method 600 includes determining if the difference calculated at 604 is greater than zero. If the difference is greater than zero, the SCR adaptation value is greater than the maximum reductant target. As a result, the SCR may be unable to convert a sufficient amount of NOx to lower the tailpipe NOx to or below the setpoint, as doing so may include reductant slip out of the SCR and/or the SCR may not have the capabilities to covert that level of NOx (e.g., the SCR may not have sufficient catalyst). Thus, the correction value is then also applied to the LNT to influence the regeneration parameters of the LNT, as explained in more detail below at 608.

On the other hand, when the difference is not greater than zero, the SCR adaptation value is indicated as being sufficient to control the NOx level. As such, the method proceeds to 622 to adapt the base reductant storage amount (discussed above with respect to FIG. 5) with the SCR adaptation value. For example, the SCR adaptation may be multiplied (e.g., after application of a gain) with the base reductant storage amount, in order to generate an adapted base reductant storage amount. At 624, reductant is supplied (e.g., injected via the introduction device 7) to the SCR according to the adapted SCR reductant storage amount. For example, if the adaptation includes an increased adapted base reductant storage amount relative to the unadapted base reductant storage amount, the amount of reductant supplied to the SCR is increased.

At 626, the LNT is regenerated according to the storage threshold and predicted minimum efficiency determined as explained above with respect to FIG. 5. In this way, only the SCR is adapted to control the NOx and the LNT is regenerated at the same frequency and intensity/duration relative to when the tailpipe NOx is not greater than the setpoint. At 628, method 600 returns to a suitable process of the method (such as 508 of FIG. 5) to continue to monitor tailpipe NOx and adapt the reductant storage amount based on the error. For example, as the error increases, the base SCR reductant storage amount may be increased up to a maximum, at which point the LNT regeneration parameters may be adapted as well (described below).

Returning to 606, when the answer at 606 is yes (e.g., when the difference between the SCR adaptation value and maximum reductant target is greater than zero), method 600 proceeds to 608 to determine an LNT adaptation value from the difference determined at 604. The LNT adaptation value may be the same as the difference. In other examples, the LNT adaptation value may be determined by applying a gain to the difference, normalizing the difference, or performing another calculation that is based on the difference.

At 610, method 600 adapts one or more LNT parameters with the LNT adaptation value. Adapting the one or more LNT parameters may include adapting the LNT NOx storage threshold, as indicated at 611. The LNT NOx storage threshold may be adapted by multiplying the LNT adaptation value with the LNT NOx storage threshold (discussed above with respect to FIG. 5). In some examples, a gain or other factor may be applied to the LNT adaptation value before it is multiplied with the LNT NOx storage threshold. Adapting the one or more LNT parameters may include adapting the predicted minimum efficiency, as indicated at 613. The minimum efficiency may be adapted by multiplying the LNT adaptation value to the minimum regeneration efficiency (discussed above with respect to FIG. 5). In some examples, a gain or other factor may be applied to the LNT adaptation value before it is multiplied with the minimum efficiency.

At 612, method 600 includes injecting reductant according to a maximum SCR reductant storage amount. As described above, the SCR adaptation value is compared to a maximum reductant target. When the SCR adaptation value exceeds the maximum reductant target, a maximum SCR reductant storage amount is calculated that includes the base SCR reductant storage amount added to the maximum reductant target. In this way, a maximum allowable/useful amount of reductant may be supplied to the SCR, without generating excess reductant slip.

At 614, method 600 includes regenerating the LNT according to the adapted LNT NOx storage threshold and/or the adapted predicted minimum regeneration efficiency. As a result, the frequency of the LNT regenerations may be adjusted (e.g., increased) and/or the intensity of the LNT regenerations may be adjusted (e.g., the regeneration durations may be increased), in order to bring the tailpipe NOx to the setpoint.

At 616, method 600 continues to monitor the tailpipe NOx and compare it to the setpoint to calculate the error. At 618, method 600 determines if the error has decreased, or if the error is still greater than zero (in some examples, 618 may be performed after a threshold amount of time since updating the LNT regeneration parameters has elapsed). If the error is greater than zero, method 600 proceeds to 620 to adjust one or more engine operating parameters to lower the engine-out NOx. The one or more engine operating parameters that may be adjusted include an exhaust gas recirculation rate, injection timing, fuel injection amount, engine output, and/or other parameters. Method 600 then returns. If the error is not above zero, method 600 returns, as the SCR and LNT adaptations were sufficient to lower the tailpipe NOx to or below the setpoint.

In some examples, rather than adapting the LNT regeneration parameters and then assessing the error prior to adjusting the one or more engine operating parameters, the method may additionally or alternatively assess the adaptations to the LNT regeneration parameters in order to determine if the engine parameters should be adjusted. For example, if the adapted LNT NOx storage threshold reaches a maximum, the method may proceed to adjust the engine operating parameters, as only adjusting the SCR and LNT parameters may not be sufficient to lower the tailpipe NOx.

Thus, as described above with respect to FIGS. 5 and 6, a NOx error between measured tailpipe NOx and a NOx setpoint may be determined. This NOx error may be used to first adjust reductant supply to the SCR, without resulting in a change to LNT regeneration frequency, LNT regeneration intensity, or engine operation. By first selecting the SCR for control, the NOx may be brought to the setpoint without wasting fuel or performing other intrusive engine operations. Then, only if the controls to the SCR are not sufficient for bringing the NOx error to zero, the LNT regeneration parameters are adjusted. For example, once the SCR reductant supply has reached a maximum level, the LNT regeneration parameters may be adjusted so that LNT regeneration frequency is increased. Then, only if the controls to both the SCR and LNT are not sufficient to bring the NOx error to zero, are the engine operating parameters adjusted.

Figure 7:
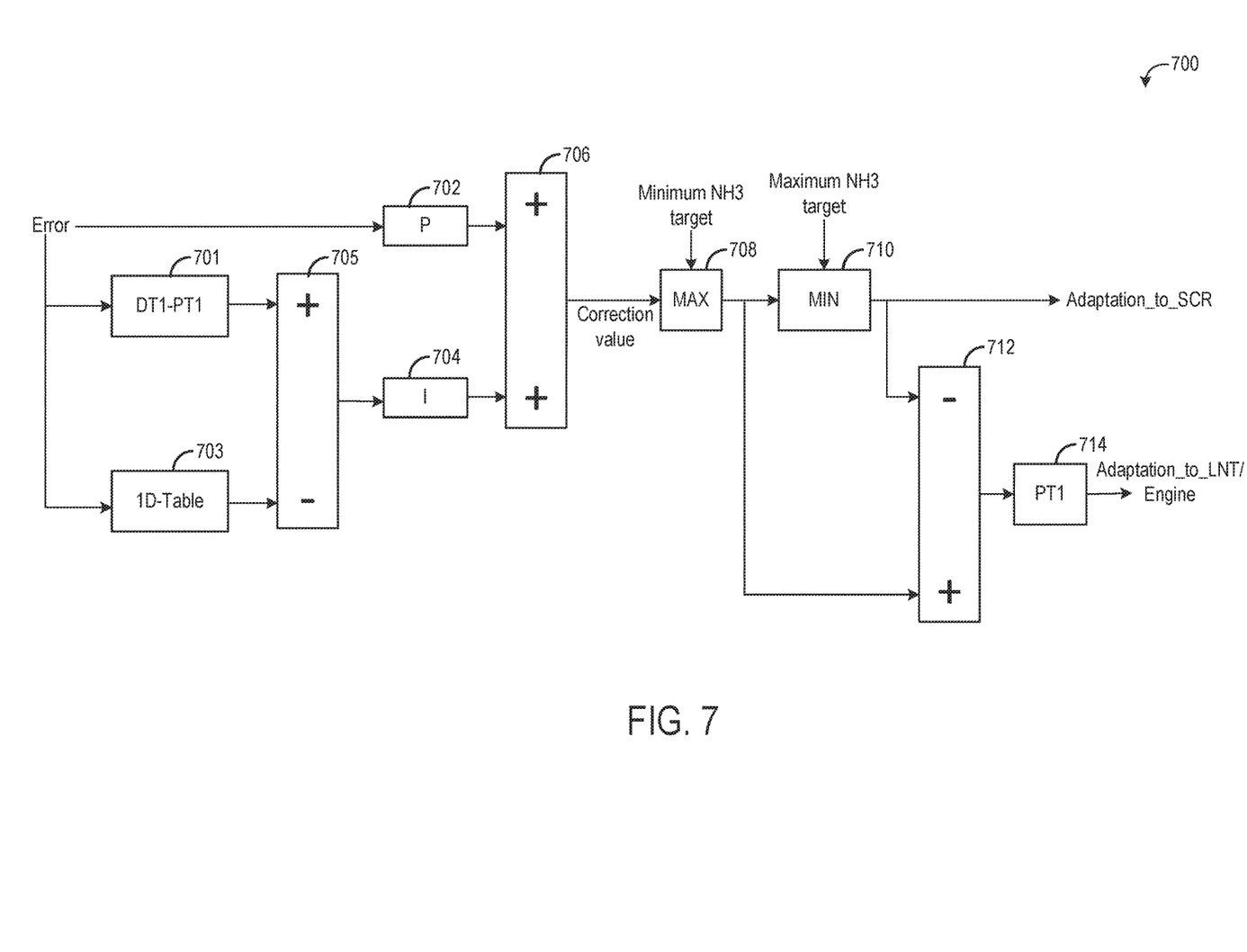
FIGS. 7 and 8 are control diagrams illustrating control actions that may be carried out during the execution of the methods of FIGS. 5 and 6.
Figure 8:
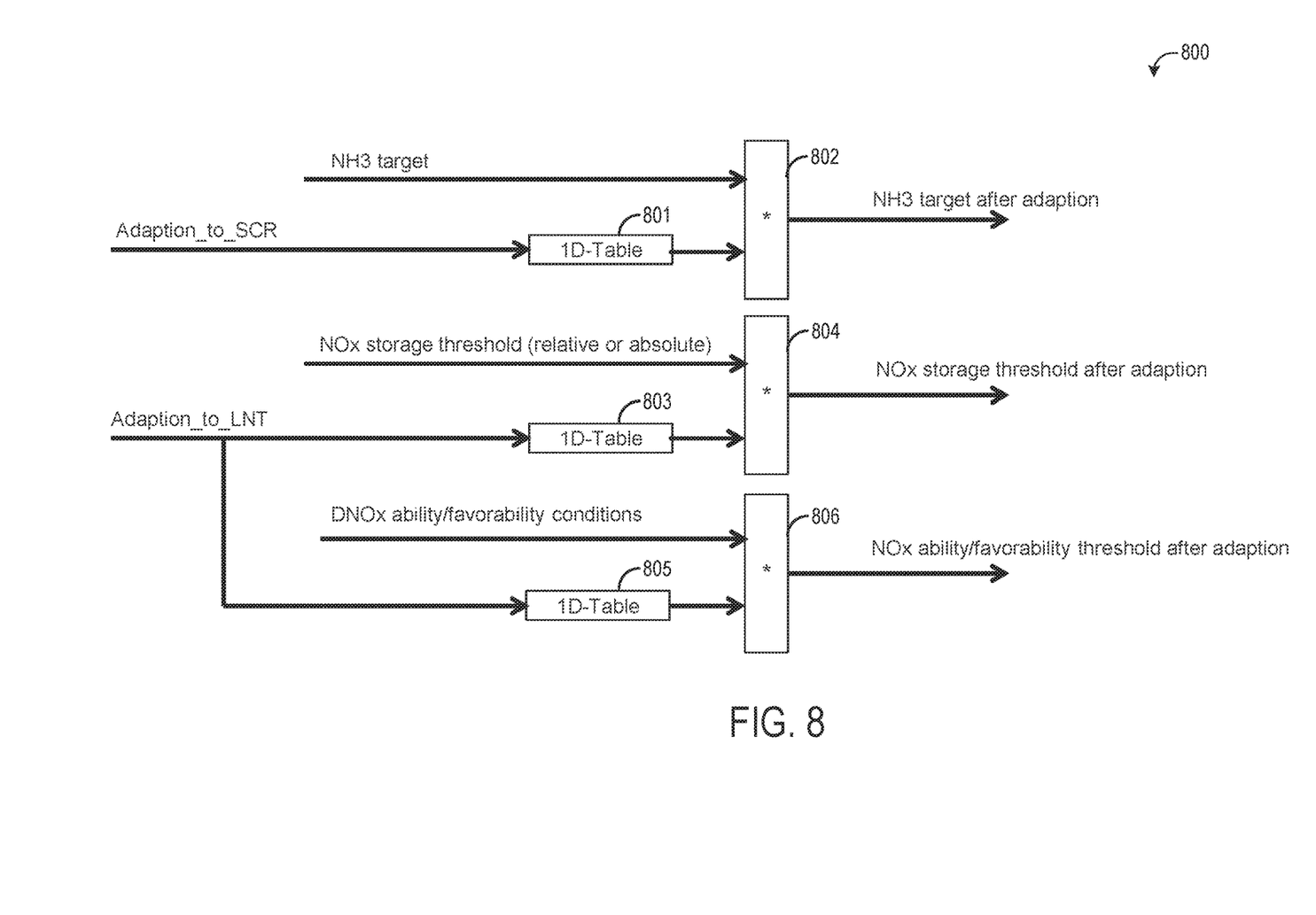

FIGS. 7 and 8 illustrate control diagrams that represent control actions that may be taken during the execution of methods 500 and 600. Referring to FIG. 7, a first control diagram 700 is illustrated. Control diagram 700 includes a PI controller that includes a proportional block 702. The proportional block receives the error (e.g., the difference between the measured tailpipe NOx and setpoint NOx level) and outputs, to an adder block 706, a value proportional to the error (e.g., by multiplying the error by a preselected gain). The PI controller also includes an integral block 704 that receives the error. Prior to being fed to the integral block, derivative of the error is determined at 701 and fed to block 705. Further, a minimum slope is determined from the error via a 1-D table 703. The minimum slope is also fed to block 705. Block 705 subtracts the minimum slope from the derivative of the error and feeds this value to the integrator block 704, which calculates the integral of the fed value. The integral is fed to the adder 706, where it is combined with the output from the proportional block 702 to generate the correction value. In some examples, the difference that is determined at 705 is integrated only when the error derivative indicates a slow response (e.g., so only in one direction). Otherwise, the integrator keeps its value. In case the error drops below zero, the integrator is reset.

The correction value is compared to a minimum reductant amount (e.g., minimum ammonia amount) at block 708 and the maximum of the correction value and minimum reductant amount is fed to block 710. Block 710 then selects the minimum of this amount and a maximum reductant target (e.g., maximum ammonia target). This selected value (e.g., the smaller of the maximum ammonia target and correction value, when the correction value is larger than the minimum ammonia target value) is output as the SCR adaptation value.

The maximum of the correction value and minimum ammonia target is also output to block 712 with the SCR adaptation value. At block 712, the SCR adaptation value is subtracted from the correction value (or the minimum ammonia target when the minimum ammonia target is greater than the correction value) and fed to block 714. At block 714, a gain or other modification may be applied to the difference calculated at 712 in order to generate the LNT adaptation value.

Referring to FIG. 8, a second control diagram 800 is illustrated. Control diagram 800 includes the SCR adaptation value and LNT adaptation value determined from the control diagram 700 of FIG. 7. The SCR adaptation value is fed into a 1-D table 801, which may output the SCR adaptation value with an applied gain or may output a conversion of the SCR adaptation value in a reductant storage amount, and the output from the table is multiplied with the base reductant storage amount (also referred to as the NH3 target in FIG. 8) described above with respect to FIG. 5, in order to generate an adapted reductant storage amount (also referred to as an NH3 target after adaptation in FIG. 8). As explained above with respect to FIG. 6, the amount of reductant (e.g., ammonia) supplied to the SCR may be adjusted according to the adapted reductant storage amount.

The LNT adaptation value is fed into a first 1-D table 803, and the output of the table is fed to block 804 along with a NOx storage threshold, as explained above with respect to FIG. 5. The output from the table 803 (e.g., which may reflect the LNT adaptation with an applied gain, or may reflect the LNT adaptation converted to a NOx storage level) is multiplied with the NOx storage threshold to output an adapted NOx storage threshold. As explained above with respect to FIG. 6, the adapted NOx storage threshold may dictate how frequency the LNT is regenerated, and thus the adaptation to the NOx storage threshold may adjust the regeneration frequency of the LNT.

The LNT adaptation value is additionally or alternatively fed into a second 1-D table 805, and the output of the table is fed to block 806 along with minimum regeneration efficiency (referred to in FIG. 8 as DNOx ability/favorability conditions), as explained above with respect to FIG. 5. The output from the table 805 (e.g., which may reflect the LNT adaptation with an applied gain, or may reflect the LNT adaptation converted to regeneration efficiency) is multiplied with the minimum efficiency to output an adapted regeneration efficiency. As explained above with respect to FIG. 6, the adapted regeneration efficiency may dictate the frequency and/or the intensity/duration of the LNT regeneration, and thus the adaptation to the regeneration efficiency may adjust the regeneration frequency and/or duration of the LNT. In some examples, both the NOx storage threshold and minimum efficiency may be adapted based on the LNT adaption value. In other examples, only the NOx storage threshold or the minimum efficiency may be adapted based on the LNT adaption value. The decision of which LNT regeneration parameter to adapt may be based on engine conditions (e.g., engine speed and load) or other parameters.

An example provides a method for controlling nitrogen oxide emissions in exhaust gas of an internal combustion engine, in an exhaust tract of which there are arranged at least one nitrogen oxide storage catalytic converter (LNT) and at least one catalytic converter for selective catalytic reduction (SCR), at least one nitrogen oxide sensor, an introduction device arranged upstream of the SCR for a reducing agent, and a control device. The method includes measuring or estimating nitrogen oxide values in an exhaust tailpipe region; detecting an upward deviation of the nitrogen oxide values in the exhaust tailpipe region from a setpoint value; responsive to detecting the upward deviation, actuating the introduction device in order to provide a first correction of the nitrogen oxide values in the exhaust tailpipe region; if the nitrogen oxide values are still deviated upward from the setpoint value after the actuation of the introduction device, performing a first adjustment of the internal combustion engine to regulate a regeneration of the LNT in order to provide a second correction of the nitrogen oxide values in the exhaust tailpipe region; and if the nitrogen oxide values are still deviated upward from the setpoint value after the first adjustment of the internal combustion engine, performing a second adjustment of the internal combustion engine to regulate an operating mode of the internal combustion engine in order to provide a third correction of the nitrogen oxide values in the exhaust tailpipe region.

In a first example of the method, actuating the introduction device comprises actuating the introduction device to increase a rate of introduction of reducing agent into the exhaust tract upstream of the SCR. In a second example of the method, which optionally includes the first example, actuating the introduction device comprises actuating the introduction device to decrease a rate of introduction of reducing agent into the exhaust tract upstream of the SCR. In a third example of the method, which optionally includes one or both of the first and second examples, the rate is decreased if a predefined threshold value of reducing agent loading has been reached. In a fourth example of the method, which optionally includes one or more or each of the first through third examples, performing the first adjustment of the internal combustion engine to regulate the regeneration of the LNT comprises increasing a frequency of regeneration events of the LNT. In a fifth example of the method, which optionally includes one or more or each of the first through fourth examples, performing the first adjustment of the internal combustion engine to regulate the regeneration of the LNT comprises increasing intensity duration of one or more regeneration events of the LNT.

Another example provides a method including responsive to a tailpipe NOx level exceeding a setpoint, adapting a base reductant storage amount for a first aftertreatment device; supplying reductant to the first aftertreatment device according to the adapted base reductant storage amount; responsive to the adapted base reductant storage amount exceeding a maximum reductant storage amount, adapting a regeneration parameter for a second aftertreatment device; and regenerating the second aftertreatment device according to the adapted regeneration parameter.

In a first example of the method, the first aftertreatment device comprises a selective catalytic reduction (SCR) device and the second aftertreatment device comprises a lean NOx trap (LNT), the SCR device and LNT positioned in series in an exhaust passage coupled to an engine, and supplying reductant comprises supplying reductant via a reductant injector positioned in the exhaust passage upstream of the SCR device. In a second example of the method, which optionally the first example, the method further includes, when the tailpipe NOx level is less than or equal to the setpoint, supplying reductant to the SCR device according to the base reductant storage amount, and wherein the base reductant storage amount is determined based on SCR device conditions. In a third example of the method, which optionally includes one or both of the first and second examples, the method further includes, when the tailpipe NOx level is less than or equal to the setpoint, regenerating the LNT according to the regeneration parameter, and wherein the regeneration parameter comprises one or more of an LNT NOx storage threshold and an LNT predicted minimum regeneration efficiency. In a fourth example of the method, which optionally includes one or more or each of the first through third examples, the method further includes, after regenerating the LNT according to the adapted regeneration parameter and responsive to the tailpipe NOx level exceeding the setpoint, adjusting one or more engine operating parameters. In a fifth example of the method, which optionally includes one or more or each of the first through fourth examples, the method further includes responsive to the adapted base reductant storage amount exceeding the maximum amount, supplying reductant to the SCR device according to the maximum reductant storage amount. In a sixth example of the method, which optionally includes one or more or each of the first through fifth examples, adapting the base reductant storage amount comprises determining a portion of an adaption signal that overflows from the adaption of the base reductant storage amount when NOx storage in the SCR device is at a limit, the portion determined by determining a first difference between the tailpipe NOx level and the setpoint and adapting the base reductant storage amount according to the first difference. In a seventh example of the method, which optionally includes one or more or each of the first through sixth examples, adapting the regeneration parameter comprises determining a second difference between the adapted base reductant storage amount and maximum reductant storage amount and adapting the regeneration parameter according to the second difference.

An example provides a system including a lean NOx trap (LNT) positioned in an exhaust passage coupled to an engine; a selective catalytic reduction (SCR) device positioned in the exhaust passage in series with the LNT; a reductant injector configured to supply reductant to the SCR device; a sensor positioned in the exhaust passage downstream of the LNT and SCR and configured to measure a tailpipe NOx level; and a controller storing instructions executable to: responsive to the tailpipe NOx level being outside a threshold range from a setpoint, adapt a base reductant storage amount for the SCR device; inject reductant, via the reductant injector, to the SCR device according to the adapted base reductant storage amount; responsive to the adapted base reductant storage amount exceeding a maximum reductant storage amount, adapt a regeneration parameter for the LNT; and regenerate the LNT according to the adapted regeneration parameter.

In a first example of the system, the regeneration parameter comprises a NOx storage threshold, and wherein to regenerate the LNT according to the adapted NOx storage threshold, the instructions are executable to adjust an amount of fuel supplied to the engine to produce a rich air-fuel ratio responsive to a NOx storage amount of the LNT reaches the adapted NOx storage threshold. In a second example of the system, which optionally includes the first example, the instructions are executable to determine if the adapted regeneration parameter exceeds a regeneration parameter threshold, and responsive to the adapted regeneration parameter exceeding the regeneration parameter threshold, adjust one or more engine operating parameters. In a third example of the system, which optionally includes one or both of the first and second examples, the one or more engine operating parameters comprise one or more of fuel injection timing, exhaust gas recirculation rate, and engine output. In a fourth example of the system, which optionally includes one or more or each of the first through third examples, the instructions are executable to inject reductant to the SCR device according to the adapted base reductant storage amount until the adapted base reductant storage amount exceeds the maximum reductant storage amount, and then the instructions are executable to inject reductant to the SCR device according to the maximum reductant storage amount. In a fifth example of the system, which optionally includes one or more or each of the first through fourth examples, when the tailpipe NOx level is within the threshold range of the setpoint, the instructions are executable to inject reductant to the SCR device according to the base reductant storage amount and regenerate the LNT according to the regeneration parameter, the base reductant storage amount determined based conditions of the SCR device.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling nitrogen oxide emissions in exhaust gas of an internal combustion engine, in an exhaust tract of which there are arranged at least one nitrogen oxide storage catalytic converter (LNT) and at least one catalytic converter for selective catalytic reduction (SCR), at least one nitrogen oxide sensor, an introduction device arranged upstream of the SCR for a reducing agent, and a control device, comprising:
measuring or estimating nitrogen oxide values in an exhaust tailpipe region;
detecting an upward deviation of the nitrogen oxide values in the exhaust tailpipe region from a setpoint value;
responsive to detecting the upward deviation, actuating the introduction device in order to provide a first correction of the nitrogen oxide values in the exhaust tailpipe region;
if the nitrogen oxide values are still deviated upward from the setpoint value after the actuation of the introduction device, performing a first adjustment of the internal combustion engine to regulate a regeneration of the LNT in order to provide a second correction of the nitrogen oxide values in the exhaust tailpipe region; and
if the nitrogen oxide values are still deviated upward from the setpoint value after the first adjustment of the internal combustion engine, performing a second adjustment of the internal combustion engine to regulate an operating mode of the internal combustion engine in order to provide a third correction of the nitrogen oxide values in the exhaust tailpipe region.

2. The method as claimed in claim 1, wherein actuating the introduction device comprises actuating the introduction device to increase a rate of introduction of reducing agent into the exhaust tract upstream of the SCR.

3. The method as claimed in claim 1, wherein actuating the introduction device comprises actuating the introduction device to decrease a rate of introduction of reducing agent into the exhaust tract upstream of the SCR.

4. The method as claimed in claim 3, wherein the rate is decreased if a predefined threshold value of reducing agent loading has been reached.

5. The method as claimed in claim 1, wherein performing the first adjustment of the internal combustion engine to regulate the regeneration of the LNT comprises increasing a frequency of regeneration events of the LNT.

6. The method as claimed in claim 1, wherein performing the first adjustment of the internal combustion engine to regulate the regeneration of the LNT comprises increasing a duration of one or more regeneration events of the LNT.

7. A method, comprising:
responsive to a tailpipe NOx level exceeding a setpoint, adapting a base reductant storage amount for a first aftertreatment device, including determining a first difference between the tailpipe NOx level and the setpoint and adapting the base reductant storage amount according to the first difference;
supplying reductant to the first aftertreatment device according to the adapted base reductant storage amount;
responsive to the adapted base reductant storage amount exceeding a maximum reductant storage amount, adapting a regeneration parameter for a second aftertreatment device, including determining a portion of an adaption signal that overflows from the adaption of the base reductant storage amount when NOx storage in a selective catalytic reduction (SCR) device is at a limit, the portion determined by determining a second difference between the adapted base reductant storage amount and the maximum reductant storage amount, and adapting the regeneration parameter according to the second difference; and
regenerating the second aftertreatment device according to the adapted regeneration parameter.

8. The method of claim 7, wherein the first aftertreatment device comprises the SCR device and the second aftertreatment device comprises a lean NOx trap (LNT), the SCR device and LNT positioned in series in an exhaust passage coupled to an engine, and wherein supplying reductant comprises supplying reductant via a reductant injector positioned in the exhaust passage upstream of the SCR device.

9. The method of claim 8, further comprising, when the tailpipe NOx level is less than or equal to the setpoint, supplying reductant to the SCR device according to the base reductant storage amount, and wherein the base reductant storage amount is determined based on SCR device conditions.

10. The method of claim 8, further comprising when the tailpipe NOx level is less than or equal to the setpoint, regenerating the LNT according to the regeneration parameter, and wherein the regeneration parameter comprises one or more of an LNT NOx storage threshold and an LNT predicted minimum regeneration efficiency.

11. The method of claim 8, further comprising, after regenerating the LNT according to the adapted regeneration parameter and responsive to the tailpipe NOx level exceeding the setpoint, adjusting one or more engine operating parameters.

12. The method of claim 8, further comprising, responsive to the adapted base reductant storage amount exceeding the maximum reductant storage amount, supplying reductant to the SCR device according to the maximum reductant storage amount.

13. A system, comprising:
a lean NOx trap (LNT) positioned in an exhaust passage coupled to an engine;
a selective catalytic reduction (SCR) device positioned in the exhaust passage in series with the LNT;
a reductant injector configured to supply reductant to the SCR device;
a sensor positioned in the exhaust passage downstream of the LNT and the SCR and configured to measure a tailpipe NOx level; and
a controller storing instructions executable to:
responsive to the tailpipe NOx level being within a threshold range from a setpoint, inject reductant, via the reductant injector, to the SCR device according to a base reductant storage amount and regenerate the LNT according to a regeneration parameter, the base reductant storage amount determined based on conditions of the SCR device;
responsive to the tailpipe NOx level being outside the threshold range from the setpoint, adapt the base reductant storage amount for the SCR device and inject reductant, via the reductant injector, to the SCR device according to the adapted base reductant storage amount; and
responsive to the adapted base reductant storage amount exceeding a maximum reductant storage amount, adapt the regeneration parameter for the LNT and regenerate the LNT according to the adapted regeneration parameter.

14. The system of claim 13, wherein the regeneration parameter comprises a NOx storage threshold, and wherein to regenerate the LNT according to the adapted NOx storage threshold, the instructions are executable to adjust an amount of fuel supplied to the engine to produce a rich air-fuel ratio responsive to a NOx storage amount of the LNT reaching the adapted NOx storage threshold.

15. The system of claim 13, wherein the instructions are executable to determine if the adapted regeneration parameter exceeds a regeneration parameter threshold, and, responsive to the adapted regeneration parameter exceeding the regeneration parameter threshold, adjust one or more engine operating parameters.

16. The system of claim 15, where the one or more engine operating parameters comprise one or more of fuel injection timing, exhaust gas recirculation rate, and engine output.

17. The system of claim 13, wherein the instructions are executable to inject reductant to the SCR device according to the adapted base reductant storage amount until the adapted base reductant storage amount exceeds the maximum reductant storage amount, and then the instructions are executable to inject reductant to the SCR device according to the maximum reductant storage amount.

* * * * *